United States Patent
Courtemanche et al.

[19]
[11] Patent Number: 6,089,043
[45] Date of Patent: Jul. 18, 2000

[54] METHOD FOR PRODUCING GLASS SHEETS USING FLOTATION

[75] Inventors: Gilles Courtemanche, Paris; Michel Coquillon, Chauconin-Neufmontiers, both of France

[73] Assignee: Saint-Gobain Vitrage, Courbevoie, France

[21] Appl. No.: 08/952,215

[22] PCT Filed: Mar. 27, 1997

[86] PCT No.: PCT/FR97/00555

§ 371 Date: Apr. 9, 1998

§ 102(e) Date: Apr. 9, 1998

[87] PCT Pub. No.: WO97/37945

PCT Pub. Date: Oct. 16, 1997

[30] Foreign Application Priority Data

Apr. 5, 1996 [FR] France .................................. 96 04369

[51] Int. Cl.$^7$ .......................... C03B 13/00; C03B 18/02; C03B 18/00
[52] U.S. Cl. ............................ 65/99.1; 65/99.5; 65/182.4
[58] Field of Search .................. 65/99.1, 99.2, 65/99.5, 182.1, 182.4

[56] References Cited

U.S. PATENT DOCUMENTS

| | | |
|---|---|---|
| 3,083,551 | 4/1963 | Pilkington ..................................... 65/32 |
| 3,220,816 | 11/1965 | Pilkington ..................................... 65/99 |
| 3,326,653 | 6/1967 | De Lajarte et al. . |
| 3,413,107 | 11/1968 | De Lajarte et al. . |
| 3,468,649 | 9/1969 | De Lajarte et al. . |
| 3,560,181 | 2/1971 | De Lajarte et al. . |
| 3,765,857 | 10/1973 | Lecourt . |
| 3,826,637 | 7/1974 | Lecourt . |
| 5,387,560 | 2/1995 | Ponthieu et al. . |
| 5,506,180 | 4/1996 | Ponthieu . |

FOREIGN PATENT DOCUMENTS

| | | |
|---|---|---|
| 0 526 272 A1 | 2/1993 | European Pat. Off. . |
| 0 576 362 A2 | 12/1993 | European Pat. Off. . |
| 1378839 | 2/1965 | France . |
| 2123096 | 9/1972 | France . |
| 2150249 | 4/1973 | France . |
| 2725713 | 10/1994 | France . |
| 2725714 | 4/1996 | France . |
| 2727399 | 5/1996 | France . |
| WO 96/11887 | 4/1996 | WIPO . |
| WO 96/11888 | 4/1996 | WIPO . |

OTHER PUBLICATIONS

Tooley: "The Handbook of Glass Manufacture," 3$^{rd}$ Ed., vol. II, pp. 710–711, 714–4 to 714–7 and 714–12 to 714–13.

Tooley: "The Handbook of Glass Manufacture," 3$^{rd}$ Ed., vol. II, pp. 932–933.

Tooley: "The Handbook of Glass Manufacture," 3$^{rd}$ Ed., vol. II, pp. 714–8.

*Primary Examiner*—Stanley S. Silverman
*Assistant Examiner*—Jacqueline A. Ruller
*Attorney, Agent, or Firm*—Pennie & Edmonds LLP

[57] ABSTRACT

The present invention relates to a process for the manufacture of glass sheets, according to which molten glass is poured into a liquid support which is denser than the glass to form a glass strip. The glass strip is drawn and is accompanied in its movement using a continuous and flexible guiding element made of a solid material capable of adhering to the molten glass, the elements being brought into contact with the side edges of the strip. The product (P) of the value (s) of the speed of the strip and of the value (t) of its final thickness is less than $2.5 \times 10^{-4}$ m$^2$s$^{-1}$. The process makes it possible to obtain thin glass sheets exhibiting a constant thickness and a satisfactory optical quality.

15 Claims, 1 Drawing Sheet

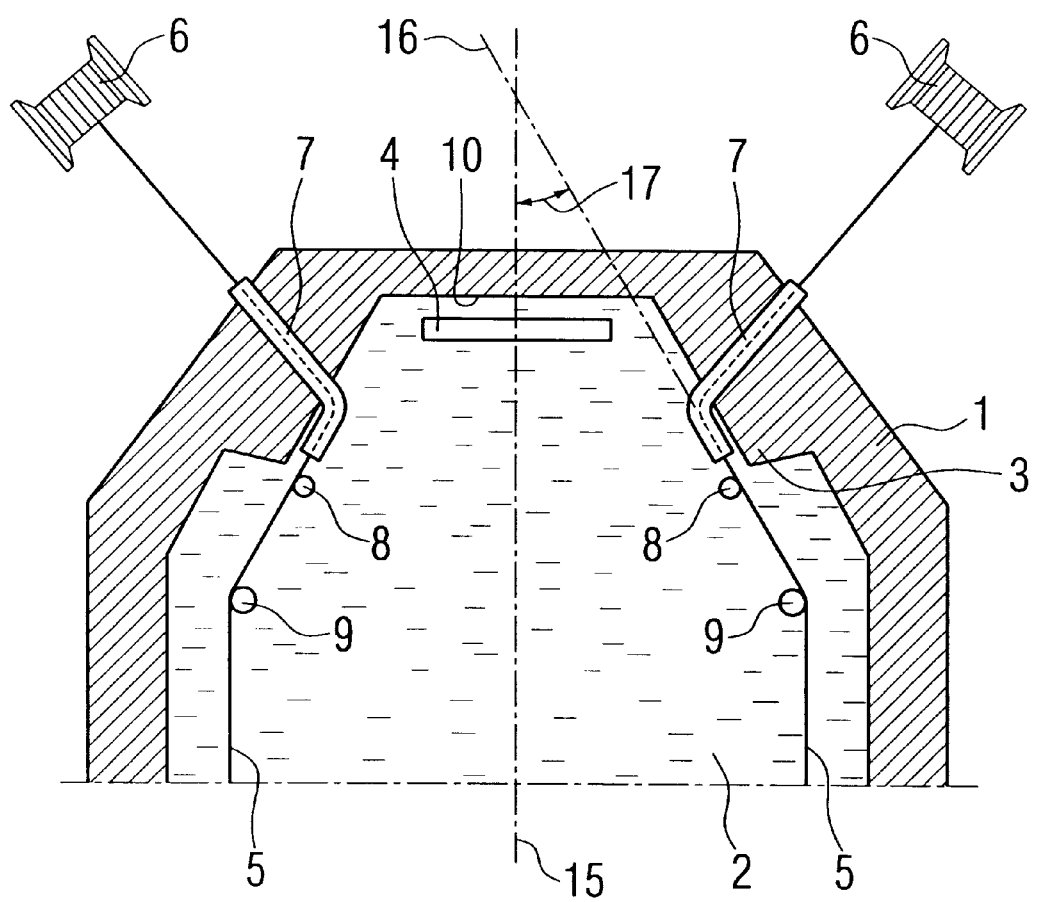

METHOD FOR PRODUCING GLASS SHEETS USING FLOTATION

BACKGROUND OF THE INVENTION

The present invention relates to a process for the manufacture by the float method of glass sheets intended for the production of glazing.

The manufacture of sheet glass by the float method is carried out in a known way by pouring molten glass onto a liquid support (or "bath") which is denser than the glass (for example a tin bath) and by causing the glass strip which is formed to progress over the surface of the bath before cutting the said strip, solidified by cooling, into sheets.

A current process consists in carrying the glass strip over the surface of the bath by seizing it laterally with top rolls positioned along the bath on both sides of the glass strip. Plants which use this process are generally high throughput plants (up to several hundred tonnes of glass per day) and are suitable for the production of glass sheets with a thickness of several millimeters. Such a process exhibits certain disadvantages: in particular, the energy consumed is high (required, inter alia, to cool all the top rolls over the length of the bath), the side edges of the strip marked by the top rolls have to be removed, which involves a not insignificant loss in material due to the size of the top rolls, and a phenomenon of necking (striction) of the glass strip at the outlet of the final top rolls is observed, it being possible for this necking to cause defects, in particular optical defects, on the glass. In addition, the necking observed for such a process increases when the thickness of the sheet produced decreases and can be crippling in the production of thin glass sheets (with a thickness, for example, of less than 3 mm). In the same way, the width of the side bands marked by the top rolls increases when the thickness of the sheet produced decreases due, in particular, to the use of a larger number of top rolls over a greater width of the strip. The geometric yield (proportion of glass remaining after cutting off the marked side bands) is thus particularly low for low glass thicknesses.

According to another process which has formed the subject of Patent FR 1,378,839 and of its additions numbered 86.221, 86.222, 86.817, 87.798 and 91.543, Patent FR 2,123,096 and Patent FR 2,150,249, continuous and flexible moveable guiding elements (for example metal wires), which adhere to the glass over the side edges of the strip and accompanying the said strip in its movement over the bath, are used. This process is more economical than the process using top rolls and the necking observed is also much weaker. However, for low thicknesses, the process as described in the abovementioned patents does not make it possible to obtain a satisfactory quality either, the glass sheets obtained not exhibiting, in particular, a constant thickness (observation of a "hollowed outline" with a thinning of the sheet at the centre).

SUMMARY OF THE INVENTION

The present invention provides a process for the manufacture of sheet glass by the float method, this process not exhibiting the abovementioned disadvantages. In particular, the present invention provides an economical process suited to the manufacture of thin glass, sheets by the float method which makes it possible to obtain thin glass sheets exhibiting in particular a satisfactory optical quality and a constant thickness.

In the process according to the invention, molten glass is poured onto a liquid support which is denser than the glass, in particular a metal bath (for example of molten tin or a tin alloy) and then the glass strip which is formed is drawn and is accompanied in its movement using continuous and flexible guiding elements made of a solid material capable of adhering to the molten glass, these elements being brought into contact with the side edges of the strip, the product (P) of the value (s) of the speed of the strip and of the value (t) of its final thickness being less than $2.5 \times 10^{-4}$ $m^2.s^{-1}$.

BRIEF DESCRIPTION OF THE DRAWINGS

The drawing FIGURE is a plan view, partly in cross-section, of the apparatus for performing the process of the present invention.

DETAILED DESCRIPTION OF THE INVENTION

In the process according to the invention, the value (s) of the speed of the strip (measured at the outlet of the bath) is chosen as a function of the value (t) of the final thickness which it is desired to obtain for the strip so that the product (P=t×s) does not exceed $2.5 \times 10^{-4}$ $m^2.s^{-1}$, preferably $2 \times 10^{-4}$ $m^2.s^{-1}$ and in a particularly preferred way $1.5 \times 10^{-4}$ $m^2.s^{-1}$, indeed $1 \times 10^{-4}$ $m^2.s^{-1}$ or $9 \times 10^{-5}$ $m^2.s^{-1}$ (in practice, it can fall to $1 \times 10^{-5}$ $m^2.s^{-1}$ or even less). Moreover, the speed of the strip is preferentially maintained at less than 15 $m.min^{-1}$, in a particularly preferred way less than 10 $m.min^{-1}$, whatever the desired final thickness of the strip. The process according to the invention is particularly suited to the manufacture of thin glass sheets with a thickness of less than 6 mm, preferentially less than 4 mm, in particular with a thickness of less than 3 mm, this process making it possible, by laying down a relatively low maximum speed (s) for a given strip thickness (t), to obtain thin glass sheets exhibiting a constant thickness (the production of a hollowed outline is avoided) and a satisfactory optical quality. "Final thickness" of the strip is understood to mean the (average) thickness of the strip after detaching the guiding elements or alternatively the thickness of the strip solidified by cooling. The final thickness of the glass strip obtained according to the invention can be much less than 2 mm, it being possible for this thickness to fall to 0.4 mm or less.

Thus, according to one embodiment of the invention, when it is desired to obtain a strip with a final thickness equal to 2 mm, the speed of the strip is chosen to be less than 7.5 $m.min^{-1}$ and, preferably, less than 6 $m.min^{-1}$, in a particularly preferred way less than 4.5 $m.min^{-1}$, indeed than 3 $m.min^{-1}$, indeed even than 1 $m.min^{-1}$ or than 0.5 $m.min^{-1}$. This speed limitation can also be advantageously observed for strips with a final thickness of less than 2 mm.

According to another embodiment of the invention, when it is desired to obtain a strip with a final thickness equal to 4 mm, the speed of the strip is chosen to be less than 3.75 $m.min^{-1}$, preferably less than 3 $m.min^{-1}$, indeed than 2.25 $m.min^{-1}$, indeed even than 1.5 $m.min^{-1}$ or than 0.5 $m.min^{-1}$. This speed limitation can also be advantageously observed for strips with a final thickness of between 2 and 4 mm.

In the process according to the invention, by adjusting the throughput and/or the width of the glass strip, it is entirely possible to maintain the speed of the strip at less than the abovementioned values in order to obtain the thicknesses shown. The products prepared thus exhibit a constant thickness and an improved quality with respect to the products of the same thickness obtained using the known processes commented on above in which the speeds of forward progression of the strips are much higher for these thicknesses, these speeds increasing as the desired thickness of the products decreases.

The guiding elements according to the invention can be composed of a wire or an assembly of wires, optionally twisted, a braiding, a grid, a band, a small chain, and the like, made of metal or of metal alloy or of an appropriate non-metallic material, in particular on the model of the guiding elements described in Patent FR 1,378,839 and its additions, in Patent FR 2,123,096 and in Patent FR 2,150,249, to which reference will be made for further information on these guiding elements and their advantages. The guiding elements according to the invention can in particular be metal wires of standard type, in particular wires made of stainless steel or of refractory alloy exhibiting, for example, a diameter of 1 to 2 mm approximately.

These guiding elements are generally tensioned between devices, such as rotating reels, cylinders or spools, and the like, situated upstream and downstream of the bath and are placed in contact with the glass strip via pressing fittings or "pads" (in the form of pressure rollers, cylinders, small bars, and the like) or introduction pipes. To ensure that the strip is carried along and drawn, it is sufficient for the guiding elements simply to adhere to the surface of the glass, these not very bulky elements being in addition advantageously placed very close to the edges of the strip, thus preventing a significant loss of material after the parts marked by the guiding elements have been cut off.

Use is preferentially made of two guiding elements situated on both sides of the strip, each of these elements being situated on one of the side edges of the strip. The guiding elements can optionally be heated in order to improve the wetting thereof by the glass and to prevent them from becoming detached from the glass, this heating, however, as a general rule not being necessary according to the present invention. Use is also preferentially made of two pressing fittings arranged opposite one another with respect to the glass strip, each being used for the insertion of a guiding element into the surface of the glass. The pressing fittings are made so as to withstand wear due to the rubbing of the guiding elements and corrosion by the molten glass. They are made, for example, of molybdenum or tungsten covered with a layer of alumina and can be attached to supports which enable their position to be adjusted. Pipes or wire guides, optionally heated, can also be used to bring the guiding elements under a certain angle to the pressing fittings.

The guiding elements can contribute to the development of the strip from the mass of glass poured onto the bath, to the movement of this strip and to its drawing. They are generally brought into contact with the glass upstream of the formation of the glass strip in the zone of the poured glass stream which then forms the edges of the strip or at the time of the formation of the glass strip or immediately after this formation, on the model of the processes described in Patents FR 1,378,839 and its additions, FR 2,123,096 and FR 2,150,249, and can be detached from the glass when the latter has arrived at a stage of the process where the cooling thereof confers a sufficient stiffness thereon.

Between the time when it is introduced into the glass via a pressing fitting and the time when it is detached from the glass, each guiding element according to the invention normally passes over at least one retaining fitting (or "spreading member" or "spacing member" or "spreading finger" or "positioning member", and the like) which is situated on the same edge of the bath as the said guiding element. This retaining fitting generally forces the guiding element to diverge in order to carry out the gradual transverse drawing of the strip to its definitive width and its definitive thickness, the spacing between the guiding elements then being maintained until the glass is cooled. The retaining fittings are generally arranged in pairs on both sides of the glass sheet (just like the guiding elements and the pressing fittings) and are also mentioned in the above-mentioned patents, to which reference will be made for further information on these fittings.

Use is preferably made of two retaining fittings arranged opposite one another with respect to the glass strip. These retaining fittings can have different shapes: rings, hooks, small bars, vertical rods, and the like, and are advantageously made of a refractory material which is resistant to wear by the guiding elements and to corrosion, for example of molybdenum or of tungsten covered with a layer of alumina. The position of these retaining fittings can preferentially be adjusted, for example via arms, so as in particular to be able to modify the width of the glass strip. The arms are advantageously made of a material exhibiting resistance to hot creep. The retaining fittings can optionally be heated in order to make it possible, for example, for the glass to knit together again after the passage of these fittings, this heating not being required in the usual case where these fittings are placed in a region where the viscosity of the glass is less than 50,000 poises. The retaining fittings are preferably situated in a zone where the glass exhibits a viscosity of between 5,000 and 50,000 poises. The distance between the pressing fittings and the retaining fittings is also advantageously adjusted so as to obtain the most uniform possible speed at any point of the strip on leaving the final retaining fittings. The necking observed after these retaining fittings is very low and is generally less than 10%, indeed 7%, by width (whereas the necking obtained in the current processes, in particular with top rolls, can reach 50%).

According to a preferred embodiment of the present invention, using two guiding elements, two pressing fittings and at least two retaining fittings arranged on both sides of the strip approximately symmetrically with respect to the strip and in which the retaining fittings force the guiding elements to diverge in order to draw the strip to the desired width, the angle of divergence (that is to say the angle measured between the axis of the strip (shown as 15 in the FIGURE) and the straight line passing between a pressing fitting and the closest retaining fitting situated on the same side of the strip) (shown as 16 in the FIGURE) is chosen to be less than, in absolute value, 25° and, preferably, less than 20°, in order to contribute to the improvement in the quality and in the flatness of the glass sheets obtained, it being possible for a greater angle to cause excessively violent drawing of the glass strip.

Also in a preferred way, the glass used in the process according to the invention is chosen so as to exhibit a rate of crystallization of less than 1.5 $\mu$m/min (rate of growth of the crystals), preferably of less than 1 $\mu$m/min, at a viscosity of between 10,000 and 100,000 poises (this rate being, for example, less than 0.4 and, preferably, 0.2 $\mu$m/min at a viscosity of 10,000 poises), in order to prevent any devitrification phenomenon, in particular at the elements such as the retaining fittings.

In a more general way, this glass must meet all the conditions known to the person skilled in the art in order to be able to be used in a process for the manufacture of glass sheets by the float method (it must not in particular contain arsenic, antimony, lead, fluorine, and the like).

It is possible to use various types of glass in the process according to the invention. In addition to the glass generally used in the float method processes (conventional soda-lime-silica glass), it is possible to use glass exhibiting a shorter working range (difference between the temperature of the glass at a viscosity of 1,000 poises and the temperature of the glass at a viscosity of $10^6$ poises), in particular less than 350° C., especially less than 300° C. In fact, the process according to the invention makes it possible to form the glass more rapidly at its final thickness than the current processes using, for example, top rolls. The glass employed until now for producing glass sheets solely by rolling processes due to its short working range can thus be used advantageously in the float method process according to the invention.

Glasses which can be used with advantage in the process according to the invention are the glasses described in Patents and Patent Applications EP 526,272, EP 576,362, FR 2,727,399, FR 2,725,713, FR 2,725,714, WO-96/11888 and WO-96/11887.

According to an advantageous embodiment of the present invention, the glass used in the process exhibits the composition described in Patent WO-96/11887, that is to say the following composition expressed as percentages by weight:

| | |
|---|---|
| $SiO_2$ | 45 to 68% |
| $Al_2O_3$ | 0 to 20% |
| $ZrO_2$ | 0 to 20% |
| $B_2O_3$ | 0 to 10% |
| $Na_2O$ | 2 to 12% |
| $K_2O$ | 3.5 to 9% |
| CaO | 1 to 13% |
| MgO | 0 to 8% | the sum of the contents of oxides $SiO_2$, $Al_2O_3$ and $ZrO_2$ remaining equal to or less than 70%, the sum of the contents of oxides $Al_2O_3$ and $ZrO_2$ being equal to or greater than 20%, the sum of the contents of alkali metal oxides $Na_2O$ and $K_2O$ being greater than or equal to 8%, the said composition optionally comprising the oxides BaO and/or SrO in proportions such that: $11\% \leq MgO+CaO+BaO+SrO \leq 30\%$, and the said composition exhibiting a lower annealing temperature (strain point) equal to or greater than approximately 530° C. and coefficient of expansion ($\alpha_{25-300°C}$) of between 80 and $95 \times 10^{-7}$/° C.

This glass is particularly advantageous in the process of the invention for the manufacture of thin heat-resistant glass sheets intended in particular for the production of plasma screens.

According to another embodiment, the glass used in the process of the invention exhibits the composition described in Patent Application WO-96/11888, that is to say the following composition expressed as percentages by weight:

| | |
|---|---|
| $SiO_2$ | 45 to 65% |
| $Al_2O_3$ | 0 to 20% |
| $ZrO_2$ | 0 to 20% |
| $B_2O_3$ | 0 to 5% |
| $Na_2O$ | 4 to 12% |
| $K_2O$ | 3.5 to 12% |
| CaO | 0 to 13% |
| MgO | 0 to 8% | the sum of the contents of oxides $SiO_2$, $Al_2O_3$ and $ZrO_2$ remaining equal to or less than 70%, the said composition optionally comprising the oxides BaO and/or SrO in proportions such that: $11\% \leq MgO+CaO+BaO+SrO \leq 24\%$, and the alkali metal oxides being introduced according to percentages by weight such that $0.22 \leq Na_2O/(Na_2O+K_2O) \leq 0.60$.

This glass is particularly advantageous in the process of the invention for the manufacture of thin glass sheets intended to be used as media in a data storage unit (production, for example, of disks used as peripheral memories in the field of computing).

The glass is generally poured onto the bath at a temperature of between 1100 and 1400° C. (this temperature being higher by approximately 40 to 100° C. than the temperatures used in the processes using top rolls, this higher temperature contributing to improving the flatness of the sheets obtained) and should exhibit, at these temperatures, a viscosity preferentially of between 1,000 and 6,000 poises. In the continuation of the journey over the bath, the strip is normally subjected to gradual cooling until it achieves a sufficient stiffness to be removed from the bath by mechanical means without being subjected to damage capable of affecting its flatness and its surface polish. It is conventionally annealed in an annealing lehr and/or subjected to other treatments. It is then cut to the required dimensions.

Generally, with the process according to the invention, it is observed that:

the products obtained exhibit a relatively constant thickness. By way of example, in many cases, the variation in thickness of the glass sheets does not exceed 70 µm, or alternatively does not exceed 6% and, preferably, 3%, indeed 1.5%, of the thickness of the glass sheet, as regards optical quality, the glass obtained exhibits a very good zebra value (greater than or equal to 50°), greater than the values obtained for glass produced according to the current processes (of the order of 40–45° for the processes using top rolls). As optical power equivalent, a zebra value of 40–45° is equivalent in value to 20–23 millidiopters and a zebra value of 50° is equivalent in value to 15 millidiopters.

Moreover, while certain surface defects (dioptric or parallel-face) of the glass obtained according to the process of the invention are similar to those of the glass obtained according to the current processes, it is on the other hand observed that the glass obtained according to the process of the invention does not exhibit, or only to a small extent, settle mark defects typical of the drawing of high-speed plants. The glass obtained does not exhibit tin defects observed in conventional processes either, due to the rapid formation of the glass in the process according to the invention.

As indicated above, the necking of the glass strip is also very low and does not cause optical defects.

The optical quality of the glass obtained according to the invention thus seems at least equal, indeed superior, to that of the glass obtained according to the current processes.

the process according to the invention is more economical than the conventional process using top rolls. By way of indication, the power necessary for the operation of a plant having a throughput of 10 to 20 t/d of glass and operating according to the invention is of the order of 90 kW whereas, for a plant with the same throughput using between 2 and 12 pairs of top rolls according to a current process, the power necessary is on average 240 kW.

the process according to the invention exhibits a better geometric yield than the current processes using top rolls. The width of each side band removed does not generally exceed 30 mm, whatever the width of the strip (the geometrical yield is thus generally greater than 70% by volume), whereas the width of each side band removed in the process with top rolls often exceeds 60 mm (geometrical yield generally less than 60% by volume). Due also to the smaller width of these side bands exhibiting a thickness different from that of the remainder of the strip, the strip obtained according to the invention does not exhibit annealing difficulties.

In addition to the process explained above, the subject of the invention is devices suitable for implementing the process according to the invention. Such devices, already explained in large part in the preceding description of the invention, are also illustrated hereinbelow, through a non-limiting example, with reference to the appended figure which represents a partial diagrammatic plan view of a plant according to the invention. Devices which are particularly suitable for the implementation of the process according to the invention are devices exhibiting an angle of divergence as defined above.

The devices according to the invention are preferentially plants with a low throughput (less than 200 t/d, indeed less than 100 t/d, indeed even less than 50 t/d or less than 25 t/d) and with a short length. The very rapid formation of the glass at its definitive thickness makes it possible, if appropriate, to use shorter plants than the current plants. The energy losses are lower and the energy consumption smaller than in the usual plants using top rolls and the degree of use of the surface of the bath is improved (that is to say that the bath is covered over the greater part of its width by the glass) due to the use of the not very bulky guiding elements, this making it possible, in the case of the use of a tin bath, to avoid losses of tin by evaporation.

As represented in the FIGURE, the plant generally contains a tank, part of the enclosed space of which is represented as 1, this tank containing a metal bath 2 such as, for example, a tin bath. The upstream part of this tank can contain divergent or "restrictor" margins 3 in the direction of forward movement of the glass. The means for heating the tank are not represented.

The molten glass is introduced at the upstream end of the tank into the zone numbered as 4. The glass, thus poured, spreads over the bath between the divergent margins under the action of gravity and of the pull exerted downstream. Wires 5 (the guiding elements), originating for example from reels 6, are then introduced into the edges of the blanket, via the upper face, before the blanket has left the divergent margins, or immediately after. Each wire can be introduced via a pipe 7 which forces a change in direction upon it, this arrangement making it possible to situate the reels laterally with respect to the furnace and to introduce the wire into the desired position, then encounters a pressing fitting 8 which subjects it to a force directed downwards in order to insert it into the glass.

Retaining fittings 9, which force the wires to diverge and then prevent them from coming together under the effect of forces of surface tension, are situated downstream of the blanketing zone. The wires rest on these retaining fittings and maintain the blanket at the width corresponding to the final thickness to be obtained. The wires accompany the strip during the cooling thereof in the zone downstream of the bath until the strip is sufficiently stiff (the temperature of the strip being, for example, less than 600° C.).

The device according to the invention can exhibit any alternative form within the capability of the person skilled in the art, it being possible for these modifications to be carried out in particular on the model of the devices described in the abovementioned patents.

Other characteristics and advantages of the invention will emerge from the following examples, given by way of illustration but without implied limitation.

EXAMPLE 1

Members which make it possible to implement the process of the invention for the purpose of the manufacture of glass with a thickness equal to or less than 2 mm were arranged in a float-glass furnace, of the type represented in the appended figure, fed by a glass melting furnace with a throughput of 8 to 12 kg/h of molten glass. The guiding elements are composed of two bright annealed or black annealed mild steel wires with a diameter of 1.5 mm.

The glass used has the following composition expressed as percentages by weight:

| | |
|---|---|
| $SiO_2$ | 54.6% |
| $Al_2O_3$ | 3% |
| CaO | 3.5% |
| MgO | 4.2% |
| $Na_2O$ | 6% |
| $K_2O$ | 6.9% |
| BaO | 3.8% |
| $ZrO_2$ | 10% |
| SrO | 8% |

The temperature of the glass at the spout is of the order of 1320° C., the wires exit from the wire guides at the rear wetting heel 10, the pressing fittings are situated at each point on the divergent margins, the retaining fittings are situated at approximately 290 mm from the rear wetting heel and at approximately 250 mm from the pressing fittings and the spacing between the fingers is 160 mm for a wire speed of 20 m/h and a final strip thickness of 1.1 mm.

It is found that the glass obtained is very flat (the deflection over a length of 5 cm is of the order of 15 μm and the variation in thickness is less than 6%). When the thickness of the strip is varied, it is found that, in contrast to the usual processes using top rolls, the optical quality of the strip increases when the thickness decreases.

EXAMPLE 2

Use is made, on a float-glass furnace such as that of Example 1, of the glass with the following composition, expressed as percentages by weight:

| | |
|---|---|
| $SiO_2$ | 50.25% |
| $Al_2O_3$ | 12.5% |
| CaO | 5% |
| MgO | 4.2% |
| $Na_2O$ | 5.3% |
| $K_2O$ | 6.2% |
| BaO | 5.95% |
| $ZrO_2$ | 3% |
| ZrO | 7.6% |

For speeds of the strip of 15 m/h, 22 m/h and 27 m/h respectively with a width between the retaining fittings of 135 mm, 130 mm and 140 mm respectively, a glass is produced with a thickness of 1.6 mm, 1.1 mm and 0.9 mm respectively exhibiting a variation of thickness of 70 μm, 70 μm and 50 μm respectively over a width of 6.5 cm. The variation in thickness lengthwise does not exceed 20 μm over a length of 6 cm.

It is noticed that, by changing the angle of divergence from 17 to 11° with a temperature at the retaining fittings of the order of 1130° C., a smaller variation in thickness is obtained.

The process according to the invention makes it possible to manufacture thin glass sheets which can be used in the field of automobiles, electronics, plasma screens, hard magnetic disks, and the like.

We claim:

1. Process for the manufacture by the float method of glass strips, according to which molten glass is poured onto a liquid support which is denser than the glass, a glass strip is formed, which glass strip includes side edges, and the glass strip is drawn at a speed along an axis of said support, the process comprising the steps of:

a) bringing continuous and flexible guiding elements made of a solid material able to adhere to the molten glass, into contact with said side edges of the glass strip via pressing fittings; and b) accompanying the strip in its movement with said elements and passing said elements over retaining fittings to cause the elements to diverge in order to ensure the gradual transverse drawing of the strip to a definitive width, with an angle of divergence being less than 25°, as measured between a straight line drawn through said pressing and retaining fittings and the axis along which the strip is drawn, with the product (P) of the value (s) of the speed of the strip and of the value (t) of its final thickness being less than $2.5 \times 10^{-4}$ $m^2 s^{-1}$.

2. Process according to claim 1, wherein the speed of the strip is less than 15 $m.min^{-1}$.

3. Process according to claim 1, wherein use is made of a glass exhibiting a rate of crystallization of less than 1.5 $\mu m/min$ at a viscosity of between 10,000 poises and 100,000 poises.

4. Process according to claim 1, wherein a geometric yield of the process is greater than 70% by volume.

5. Process according to claim 1, wherein necking is less than 10% by width.

6. Device for the implementation of the process for the manufacture by the float method of glass strips or sheets cut from the strips, according to which molten glass is poured onto a liquid support which is denser than the glass, a glass strip is formed, which glass strip includes side edges, and the glass strip is drawn at a speed along an axis of said support, wherein continuous and flexible guiding elements made of a solid material able to adhere to the molten glass are brought into contact with said side edges of the strip, and the glass strip is accompanied in its movement with said elements, the product (P) of the value (s) of the speed of the strip and of the value (t) of its final thickness is less than $2.5 \times 10^{-4}$ $m^2 s^{-1}$, comprising:

a) at least one pressing fitting and one retaining fitting; and b) an angle of divergence of less than 25°, as measured between a straight line drawn through said pressing and retaining fittings and the axis along which the strip is drawn.

7. The process according to claim 1 wherein the strip is drawn to a thickness of less than 6 mm.

8. Process for the manufacture of a strip of float glass which comprises:

pouring molten glass onto a liquid support which is denser than the glass to form a glass strip which has side edges, drawing the glass strip at a speed along an axis of said liquid support, and guiding the edges of the glass strip along a path to ensure a gradual transverse drawing of the glass strip to a definitive width, with an angle of divergence of less than 25°, as measured between the straight line drawn through the side edges of the transversely drawn glass and the axis along which the strip is drawn, with the product of the value of the speed of the strip and of the value of its final thickness being less than $2.5 \times 10^{-4}$ $m^2 s^{-1}$.

9. Process according to claim 8, wherein the side edges of the glass strip are guided by contact with continuous and flexible guiding elements made of a solid material which are adhered to the molten glass as the strip is formed, and by passing the elements over retaining fittings to cause the elements to diverge in order to draw the glass strip to the definitive width.

10. Process according to claim 9, wherein each guiding element is brought into contact with the glass by at least one pressing fitting and then is passed over at least one retaining fitting which causes it to diverge in order to ensure the gradual transverse drawing of the strip to the definitive width, with the angle of divergence being measured between a straight line drawn through said pressing and retaining fittings and the axis along which the glass strip is drawn.

11. Process according to claim 8 which further comprises drawing the glass strip at a speed of less than 15 $m.min^{-1}$.

12. Process according to claim 8, which further comprises drawing the glass strip to a thickness of less than 6 mm at a geometric yield of the process which is greater than 70% by volume.

13. Process according to claim 8, wherein the glass strip exhibits a working range of less than 350° C.

14. Process according to claim 8, wherein the glass exhibits a rate of crystallization of less than 1.5 $\mu m/min$ an a viscosity of between 10,000 and 100,000 poises.

15. Process according to claim 8, wherein the glass is transversely drawn by less than 10%.

* * * * *

UNITED STATES PATENT AND TRADEMARK OFFICE
CERTIFICATE OF CORRECTION

PATENT NO.    : 6,089,043

DATED         : July 18, 2000

INVENTOR(S)   : Gilles COURTEMANCHE et al.

It is certified that error appears in the above-identified patent and that said Letters Patent is hereby corrected as shown below:

On the title page, please insert the reference to the foreign application priority as follows:

--[30]  Foreign Application Priority Data

April 5, 1996  [FR]  France .......................... 96/04369--.

Signed and Sealed this

Seventeenth Day of April, 2001

Attest:

NICHOLAS P. GODICI

*Attesting Officer*    *Acting Director of the United States Patent and Trademark Office*